March 11, 1930. T. W. BLAKEMAN 1,750,158
STRAINER
Filed Sept. 3, 1929
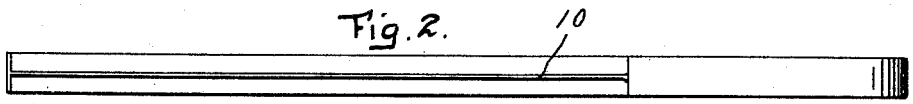
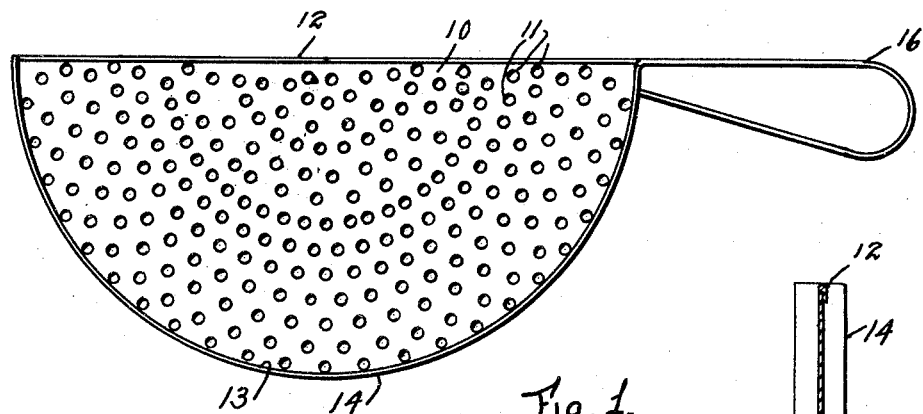
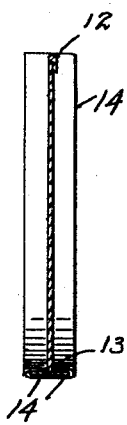
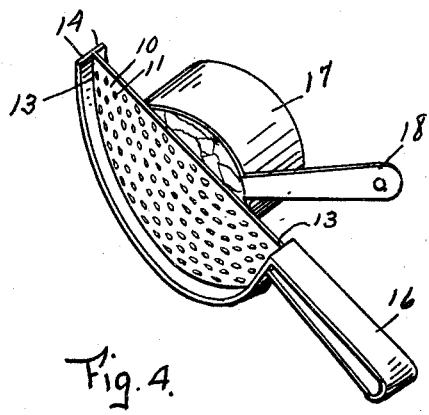
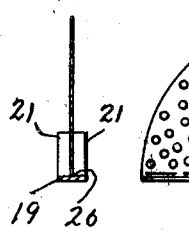
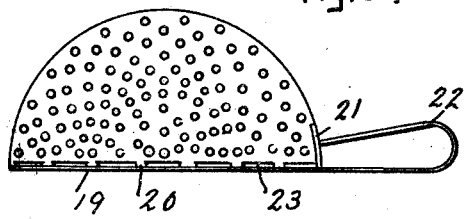

Patented Mar. 11, 1930

1,750,158

UNITED STATES PATENT OFFICE

THOMAS W. BLAKEMAN, OF LONG BEACH, CALIFORNIA

STRAINER

Application filed September 3, 1929. Serial No. 389,935.

My invention relates to kitchen utensils such as pots and pans commonly used in cooking vegetables such as potatoes and the like and it has for its object the provision of a strainer for use therewith when straining the water or other liquid in which the vegetables have been cooked.

It is the prime object of my invention to provide a strainer to be used to replace the lid of the utensil whereby the said utensil can be tipped to permit the liquid to flow therefrom without any danger of the contents being spilled out or the user being burned or scalded by the flowing liquid.

Another object is to provide a device of the above character which is so constructed as to be equally adaptable to various sizes of utensils and which will be simple in construction and operation and very efficient in use.

Other objects and advantages will appear hereinafter and while I have shown and will describe the preferred form of my invention, it will be understood that I do not limit myself to such preferred form, but that various changes and adaptations may be made therein without departing from the spirit of my invention.

In the drawings accompanying and forming a part hereof:

Fig. 1 is a side elevation of my invention.

Fig. 2 is a top plan of Fig. 1.

Fig. 3 is a vertical transverse central section through Fig. 1.

Fig. 4 is a perspective view showing my strainer in use.

Fig. 5 is a side elevation of a modified form of my invention.

Fig. 6 is a central vertical section through Fig. 5.

Referring to the drawings my device comprises a semi-circular body member 10, preferably formed of sheet metal such as tin or aluminum, and provided with a plurality of holes or apertures 11 therethrough. The upper straight edge is folded upon itself as at 12 to provide a smooth edge and around the arcuate edge 13 is provided an annular rim 14 which projects for a distance beyond each edge or from each side of the body 10, the object of which will be hereafter explained.

Formed at one end of the arcuate rim 14 is a handle 16 which is integral with the rim 14 in the present instance but may be otherwise if found necessary or desirable. The rim 14 may be secured to the edge of the body 10 in any suitable or desirable manner or may be integral therewith.

In the use of my invention the strainer will be grasped or held in one hand by the handle 16 and the pot 17 containing the vegetables to be strained will be held in the other hand by the handle 18. The strainer will then be positioned upon the top of the pot with the rim 14 engaging the upper edge of the pot and the body 10 resting upon the top of the pot, it being understood that the pot cover has first been removed. By tipping the pot and strainer in unison the liquid within the pot will be permitted to flow out through the holes 11, the body 10 acting to prevent the vegetables within the pot from spilling out.

In the form shown in Figs. 5 and 6, the construction is the same as the preferred form with the exception that the rim or flange 19 extends along the straight edge 20 instead of the curved edge and an abutment 21 is provided at the front of the handle 22 to prevent liquid from flowing onto the handle.

While I have shown my device as being provided with round holes or apertures 11 it will be understood that I may provide apertures of any other shape or configuration or I may use slits such as are shown at 23 in Fig. 5.

Having described my invention what I claim is:

1. A device of the character described comprising a reticulated plate provided along one edge with an outstanding flange extending at right angles from each side of said plate, and a handle projecting from one end of said plate.

2. A device of the character described comprising a reticulated plate semi-circular in elevation having a rim projecting from each side of said plate at the arcuate portion, said rim being bent at one end to form a handle projecting from one end of said plate in alinement therewith.

3. A strainer for pots, pans and the like comprising a semi-circular reticulated plate having an outstanding rim surrounding the arcuate portion thereof and projecting from each side thereof at right angles thereto, one end of said rim being extended beyond the end of said plate in alinement with the straight edge and then bent to form a handle.

4. A device of the character described comprising a semi-circular plate provided with a plurality of apertures therethrough and having an outstanding rim projecting from each side of the arcuate portion thereof, one end of said rim being extended beyond the end of said plate for a distance and then being bent to extend parallel with said extended portion and having its free end secured to said plate to form a handle.

In witness that I claim the foregoing I have hereunto subscribed my name this 30th day of August 1929.

THOMAS W. BLAKEMAN.